United States Patent [19]

Eubank

[11] 4,156,966
[45] Jun. 5, 1979

[54] GROUT SAW

[76] Inventor: William J. Eubank, 6833 Beechnut #14, Houston, Tex. 77074

[21] Appl. No.: 885,900

[22] Filed: Mar. 13, 1978

[51] Int. Cl.² .............................................. B27B 21/00
[52] U.S. Cl. .................................... 30/166 R; 30/172; 145/31 C
[58] Field of Search ................. 30/166, 144, 172, 335, 30/339; 145/31 C

[56] References Cited

U.S. PATENT DOCUMENTS

| 148,136 | 3/1874 | Parmele | 145/31 C |
| 311,170 | 1/1885 | Beurmann | 30/166 R |
| 1,438,645 | 12/1922 | Hill | 145/31 C |
| 1,856,887 | 5/1932 | Scheppy | 30/172 |
| 1,872,939 | 8/1932 | Haddican | 145/31 C |

Primary Examiner—Jimmy C. Peters

Attorney, Agent, or Firm—Browning, Bushman & Zamecki

[57] ABSTRACT

Disclosed is a blade for cutting and scrapping that is receivable by a holding device. A keeper is joined to a base plate of the holding device by means of a pair of screws. The blade is constructed with a pair of slots of different lengths extending inwardly from opposite ends of the blade and running generally parallel to the cutting edge of the blade. The blade may be inserted between the keeper and base plate with one screw being received by the longer of the two slots. The blade may then be positioned between the keeper and base plate with the shorter slot aligned with the other screw. The blade may then be moved forward so that the shorter slot receives the second screw while the longer slot still retains the first screw. Tightening the screws then secures the blade in cutting position between the keeper and the base plate.

9 Claims, 6 Drawing Figures

GROUT SAW

BACKGROUND OF THE INVENTION

1. Field of the Invention.

The present invention pertains to cutting tools. More specifically, the present invention relates to hand tools for cutting and scraping, and finds particular application in the removal of grout between tiles.

2. Description of Prior Art.

In the process of repairing, refinishing, or reconstructing tiled walls and floors old grout is usually removed and replaced. Such grout that is still hard and intact is usually removed by chipping or cutting the grout with a knife or other tool not specifically designed for the task. One attempt at providing a tool for more easily removing grout employs a saber saw blade. The blade is clamped and held by friction between two metal fittings joined together by screws. A handle is attached to one of the metal fittings, and provides a means whereby the saber saw blade may be propelled along the grout to cause the teeth of the blade to cut into the grout. However, the shape of the saber saw blade is such that excess blade material extends beyond the fittings, and may inconvenience use of the tool as a grout remover. Also, an improved method of anchoring the blade, rather than merely by friction is desirable.

SUMMARY OF THE INVENTION

The present invention includes a generally rectangular blade with slots extending inwardly from opposite ends. The slots are of unequal length, and generally parallel to the cutting edge of the blade. The blade may be easily inserted into a holding device which retains the blade firmly by means including shafts received by the blade slots.

The present invention contemplates a holding device including a handle attached to a base. The base includes a base plate featuring a flat surface and two threaded holes. A keeper may thus be joined to the base plate by means of a pair of screws or bolts passing through the keeper and threadingly engaging the holes of the base plate.

The blade may be inserted between the opposing surfaces of the keeper and base plate. Thus, the longer of the two blade slots receives one of the screws, and the blade is swung into position to align the shorter slot of the blade with the other screw. The blade is then moved forward so that each of the slots is receiving one of the screws. The screws are then tightened so that the blade is held in place by the screws passing through the slots as well as the two opposed surfaces of the keeper and base plate pressing against the blade. In this configuration, the cutting edge of the blade, which may be serrated, extends beyond the leading edges of the keeper and the base plate. With the screws loosened, but not necessarily withdrawn from the base plate, the manipulation of the blade relative to the holding device may be generally reversed to remove the blade therefrom.

It will be appreciated that the present invention provides a hand tool which is easy to use, and whose blades may be readily changed. Furthermore, the cutting blade is held securely by the holding device by more than a mere friction fit. The shafts of the screws passing through the blade slots prevent the blade from being pulled from the holding device during use. Furthermore, as the blade is drawn in one direction along the grout to be removed, the greater portion of the propelling force applied to the blade may be transmitted to the blade by way of one of the screws rather than the friction grip provided by the combination of the keeper and the base plate. Also, the blade shape and size may be specifically determined to prevent excessive and useless blade material extending beyond the holding device to interfere with the maneuvering of the blade in a grout removing process.

DESCRIPTION OF PREFERRED EMBODIMENTS

Figure 2:
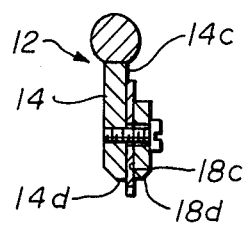
FIG. 2 is a cross-sectional view along line 2—2 of FIG. 1.
Figure 1:
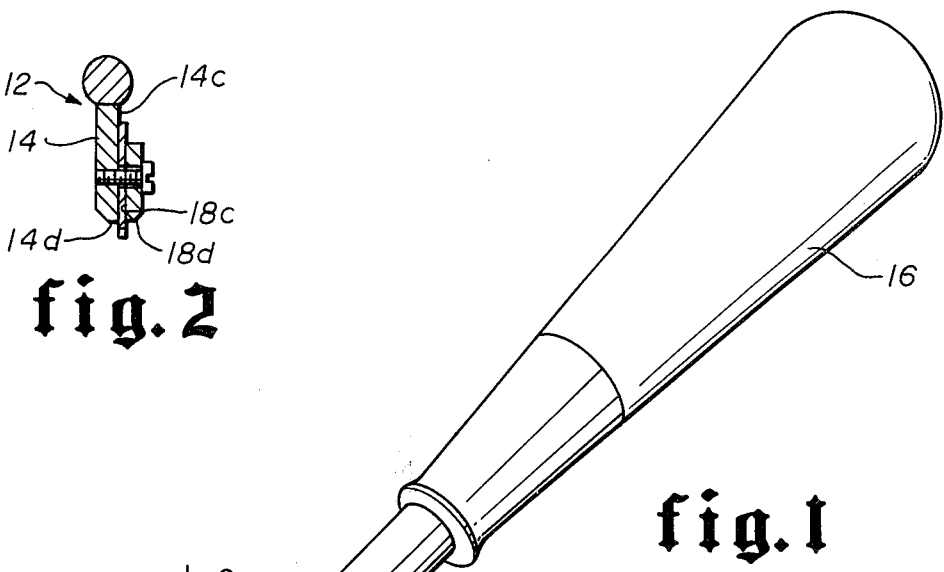
FIG. 1 is a prespective view of a grout saw according to the present invention.
Figure 3:
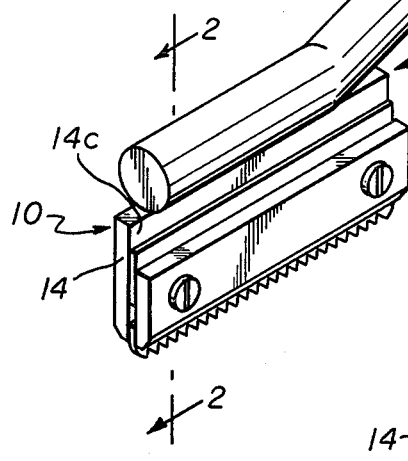
FIG. 3 is an exploded view, in perspective, of a portion of the grout saw showing details of the blade construction.
Figure 3:
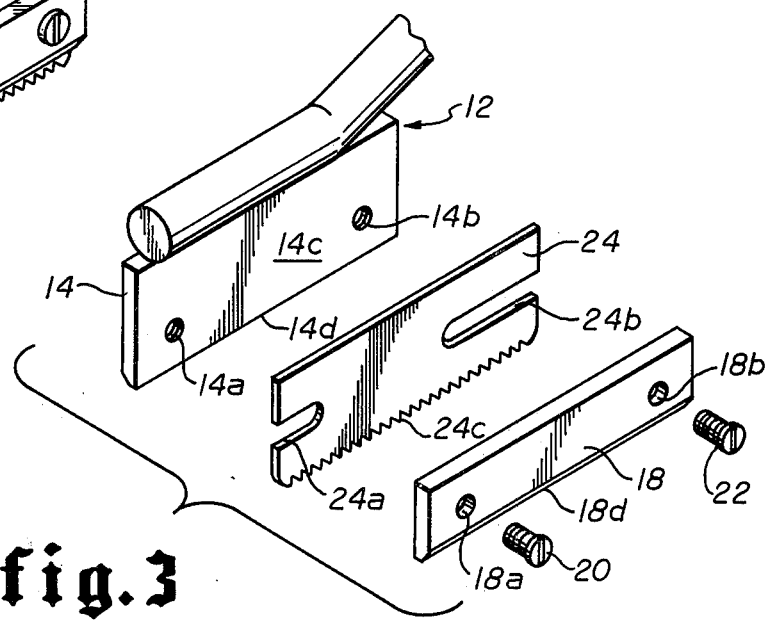

A grout saw according to the present invention is shown generally at 10 in FIG. 1, with details illustrated in FIGS. 2 and 3. A base, shown generally at 12, includes a base plate 14 featuring two threaded holes 14a and 14b. The base plate 14 has a flat surface 14c bounded along the bottom, as illustrated, by a leading edge 14d. A handle 16 is joined to the base 12 to provide a means for easy manipulation of the saw.

A keeper 18 also features a pair of holes 18a and 18b; however, these holes are not threaded. A flat surface 18c (FIG. 2) and a lower, leading edge 18d are also provided on the keeper.

The pairs of holes 18a, 14a, and 18b, 14b are aligned so that screws, or bolts, 20 and 22 may pass through the unthreaded holes of the keeper 18 and threadedly engage the base plate 14 by way of its threaded holes. Thus, the keeper 18 may be attached to the base plate 14 by means of the screws 20 and 22.

A blade 24 is provided in the shape generally of a rectangular lamina. Each of the two ends of the blade 24 are broken by an inwardly extending slot. The first slot 24a is shorter than the second slot 24b, and both slots generally parallel a cutting edge 24c of the blade 24. Also, the slots 24a and 24b are positioned laterally across the blade 24 equal distances from the cutting edge 24c. The cutting edge 24c is serrated.

With the grout saw 10 assembled as shown in FIG. 1, that is, with the blade 24 sandwiched between the keeper 18 and the plate 14, and the screws 20 and 22 passing through the keeper holes 18a and 18b, as well as the slots 24a and 24b of the blade, and threadedly engaging the blade at holes 14a and 14b, the blade cutting edge 24c extends beyond the blade and keeper leading edges 14d and 18d. Thus, with the bolts 20 and 22 tightened to hold the plate 14, blade 24 and keeper 18 firmly together, the saw at 10 may be manipulated, by use of the handle 16, to press the blade cutting edge 24c into material, such as grout between tiles, while the saw is drawn along the material to effect a scraping and/or cutting of the material by the teeth of the serrated cutting edge. While the blade cutting edge 24c may be constructed with cutting teeth in virtually any form desirable, and the saw may be propelled by pushing as well as pulling on the handle 16 to move the blade 24 in both longitudinal directions along the material to be cut, the grout saw at 10 is readily used by drawing the blade 24 toward the general direction of the handle 16 while keeping the blade firmly pressed against the material to be removed.

Figure 4:
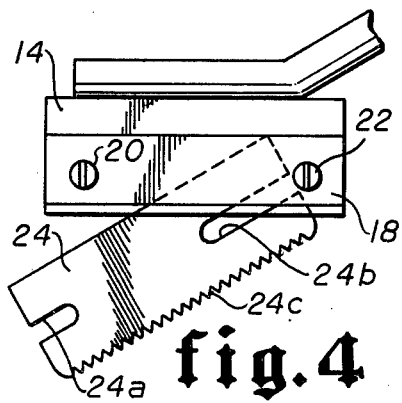
FIGS. 4 through 6 are elevational views of the portion of the grout saw detailed in FIG. 3, illustrating the manner of insertion of the blade within the holding device.
Figure 5:
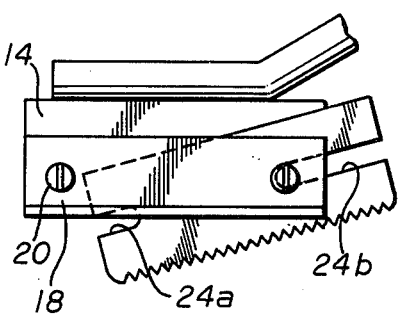
Figure 6:
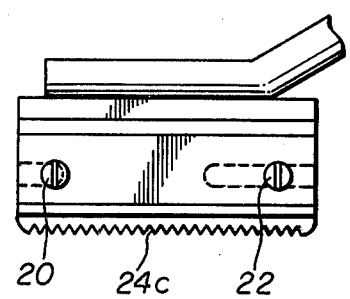

FIGS. 4-6 illustrate how the blade 24 may be mounted while the keeper 18 is attached to the base plate 14. The blade 24 is oriented with the longer slot 24b generally toward the direction of the handle 16. With the screws 20 and 22 loosely joining the keeper 18 to the base plate 14, the end of the blade 24 including the longer slot 24b is inserted between the keeper and the base plate with the slot 24b aligned with the shaft of the screw 22 (FIG. 4). The blade 24 is advanced so that the longer slot 24b receives the shaft of the screw 22, and the opposite end, including the shorter slot 24a, is cleared to be moved between the shafts of the two screws 20 and 22 as the blade is rotated (FIG. 5). The blade 24 is sufficiently rotated to align the shorter slot 24a with the shaft of the screw 20, and is then moved forward so that the slot 24a receives the screw 20 (FIG. 6). As may be seen in FIG. 6, screw 22 is retained within the longer slot 24b even when the blade 24 is positioned such that its movement away from screw 22 is limited by screw 20 being wholly inserted within the shorter slot 24a.

In the configuration of FIG. 6, both screws 20 and 22 may be tightened, causing the keeper 18 to press the blade 24 against the base plate 14. Thus, the blade 24 is securely held within the grout saw by a combination of compressional forces effected through the keeper 18 and the base plate 14, and the presence of the screws 20 and 22 being enclosed within the blade slots 24a and 24b, respectively. Furthermore, it will be appreciated that, as the grout saw 10 is drawn generally in the direction of the handle 16 while the blade cutting edge 24c is pressed against material to be cut and/or scraped, the screw 20 residing in the short slot 24a assures that the blade 24 will not slip to the left relative to the base plate 14, as viewed in FIG. 6, under the influence of the reaction forces applied to the blade by the material being cut and/or scraped. The shaft of the screw 20, acting against the inner end of the slot 24a, may transmit to the blade 24 the majority of the force applied to the grout saw 10 to effect the cutting and/or scraping of the grout.

The blade 24 may be removed from the grout saw without completely disengaging the screws 20 and 22 from the keeper plate 14, by generally reversing the operation indicated in FIGS. 4-6. Thus, the screws 20 and 22 are loosened, allowing the blade 24 to be moved toward screw 22 until the end of the blade including the shorter slot 24a is clear of the second screw 20. Then, the end of the blade is swung outwardly from the position between the screws 20 and 22 to clear the blade of the former screw, as indicated in FIG. 5. The blade 24 is then free to be moved forward to release the screw 22 from the longer slot 24b, and free the blade from the base plate 14 and keeper 18.

The blade 24 of the present invention may be constructed and designed to exclude any excess blade material extending beyond the ends of the base plate 14 and keeper 18 to inconvenience the use of the grout saw in scraping grout from between tiles, particularly in situations where the cutting edge 24c of the blade must be positioned against a wall or corner.

It will be appreciated that the present invention provides a grout saw readily employable for cutting and/or scraping grout from between tiles without the inconvenience of relying on a blade, or other tool, not specifically designed for, or particularly adaptable to, such a task. In particular, the blade of the present invention may readily be installed in or removed from the remainder of the grout saw for purposes of storage, or so that a fresh blade may replace one dulled from use. Furthermore, the installation and removal of the blade may be carried out without completely disassembling the remainder of the grout saw by simply loosening the screws, or bolts, which hold the keeper in place relatively to the base plate.

The construction of the grout saw may be altered within the definition of the invention. For example, the holes in the keeper may be threaded while the holes in the base plate are smooth so that the screws are inserted through the base plate and threadedly engage the keeper. Other variations of the coupling of the keeper to the base plate, which provide for the shafts of the fasteners to be enclosed by the slots of the blade, may be suggested by the present disclosure without departing from the spirit of the invention.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. A tool comprising:
   (a) base means including a plate with a plate first surface bounded, in part, by a plate leading edge;
   (b) keeper means, including a keeper first surface bounded, in part, by a keeper leading edge;
   (c) first and second fastening means, each such fastening means including a shaft, and for connecting said keeper means to said base means with said keeper means oriented relative to said plate such that said keeper first surface faces said plate first surface and such that said keeper leading edge and said plate leading edge are generally directed toward the same direction; and
   (d) a blade including a blade cutting edge and first and second slots such that, with said keeper means so connected to said base means by said first and second fastening means, said blade may be inserted, or removed from, between said plate first surface and said keeper first surface, with said first fastening means shaft passing through said first slot and said second fastening means shaft passing through said second slot, and such that, with said blade so between said plate and keeper first surfaces, said plate, said keeper means, and said first and second fastening means cooperate to hold said blade with said blade cutting edge extending beyond said plate and keeper leading edges.

2. A tool as defined in claim 1 wherein said first fastening means comprises a screw and said second fastening means comprises a screw, whereby said plate and said keeper means may be drawn together to press on said blade held therebetween.

3. A tool as defined in claim 2 wherein said base means and said keeper means each include holes for receiving said screws, said holes of one or the other of said base means or said keeper means being threaded to threadedly engage said screws.

4. A tool as defined in claim 1 wherein said blade cutting edge is serrated.

5. A tool as defined in claim 1 further comprising handle means connected to said base means.

6. A tool as defined in claim 5 wherein said handle means is oriented at an acute angle relative to said blade cutting edge when said blade is so held by said plate, said keeper means, and said first and second fastening means.

7. A blade comprising a generally rectangular lamina having a first end and a second end, a cutting edge along one side, a first slot extending inwardly from said first end, and a second slot extending inwardly from said second end, said second slot being of greater length than said first slot, such that said blade may be inserted within a holding device featuring two shafts passing between two opposed holding surfaces by receiving one of said shafts within said second slot, aligning said first slot with the other of said shafts, and moving said blade to receive said latter shaft within said first slot while retaining said former shaft within said second slot.

8. A blade as defined in claim 7 wherein said cutting edge is serrated.

9. A blade as defined in claim 7 wherein said two shafts are screws, and wherein said two holding surfaces may be drawn generally together by engagement of said screws relative to said holding device being tightened.

* * * * *